(12) United States Patent
Gu et al.

(10) Patent No.: US 12,487,880 B2
(45) Date of Patent: Dec. 2, 2025

(54) DATA CHECK METHOD AND RELATED DEVICE

(71) Applicant: HUAWEI TECHNOLOGIES CO., LTD., Guangdong (CN)

(72) Inventors: Xulin Gu, Chengdu (CN); Siwei Luo, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/343,093

(22) Filed: Jun. 28, 2023

(65) Prior Publication Data
US 2023/0342239 A1  Oct. 26, 2023

Related U.S. Application Data

(63) Continuation of application No. PCT/CN2021/100924, filed on Jun. 18, 2021.

(30) Foreign Application Priority Data

Dec. 29, 2020 (CN) .......................... 202011601078.0
Jan. 5, 2021 (CN) .......................... 202110008015.2

(51) Int. Cl.
*G06F 11/10* (2006.01)
*G06F 12/02* (2006.01)
*G06F 13/16* (2006.01)

(52) U.S. Cl.
CPC ...... *G06F 11/1004* (2013.01); *G06F 12/0238* (2013.01); *G06F 13/1668* (2013.01)

(58) Field of Classification Search
CPC .. G06F 12/0246; G06F 11/00; G06F 11/1004; G06F 12/0238; G06F 13/1668;
(Continued)

(56) References Cited

U.S. PATENT DOCUMENTS

2008/0151883 A1* 6/2008 Cockerell ............. H04L 1/0041
370/389
2011/0239081 A1* 9/2011 Hida ................. H03M 13/2906
714/755
(Continued)

FOREIGN PATENT DOCUMENTS

CN  103577275 A  2/2014
WO  2020186081 A1  9/2020

OTHER PUBLICATIONS

International Search Report and Written Opinion in International Appln. No. PCT/CN2021/100924, mailed on Sep. 28, 2021, 14 pages (with English translation).
(Continued)

*Primary Examiner* — Guerrier Merant
(74) *Attorney, Agent, or Firm* — Fish & Richardson P.C.

(57) ABSTRACT

The present disclosure relates to a method applied to a memory controller (MC). In an example, the MC is disposed in a computer. The computer further includes at least one central processing unit core and at least one memory. The MC receives a cyclic redundancy check (CRC) processing instruction sent by the at least one central processing unit core. The MC obtains target data from the at least one memory based on the CRC processing instruction. The MC performs calculation on the target data to obtain a CRC value of the target data. The MC sends the CRC value to the at least one central processing unit core.

20 Claims, 4 Drawing Sheets

(58) Field of Classification Search
CPC ...... H03M 13/09; G11C 29/76; G11C 29/886; G11C 29/44
See application file for complete search history.

(56) References Cited

U.S. PATENT DOCUMENTS

2012/0324321 A1* 12/2012 Chowdhury .......... H03M 13/09
714/E11.032
2016/0342463 A1* 11/2016 Oshima ............... G06F 11/1004
2019/0042093 A1 2/2019 Adams et al.

OTHER PUBLICATIONS

Extended European Search Report in European Appln No. 21912931.9, dated May 2, 2024, 7 pages.

* cited by examiner

DATA CHECK METHOD AND RELATED DEVICE

CROSS-REFERENCE TO RELATED APPLICATIONS

This application is a continuation of International Application No. PCT/CN2021/100924, filed on Jun. 18, 2021, which claims priority to Chinese Patent Application No. 202011601078.0, filed on Dec. 29, 2020, and Chinese Patent Application No. 202110008015.2, filed on Jan. 5, 2021. All of the aforementioned patent applications are hereby incorporated by reference in their entirety.

TECHNICAL FIELD

This application relates to the field of data storage technologies, and in particular, to a data check method and a related device.

BACKGROUND

With the development and progress of the Internet, a global data volume increases at a high speed every day, imposing higher requirements on data storage systems. One of challenges that the data storage systems face is data damage. Data may be distorted during transmission, read/write processes, or the like. If data damage cannot be detected in a timely manner, more serious consequences such as data loss may occur.

Currently, a cyclic redundancy check (CRC) value is usually used to implement data integrity protection. The CRC value is an error check value generated by performing complex calculation on stored data. In a computer, a memory may store data and a data integrity field (data integrity field, DIF) of the data, where the DIF includes information such as a CRC value of the data. In this way, when reading the data from the memory, a processor may recalculate a CRC value of the read data, and compare the recalculated CRC value with the originally stored CRC value, to determine whether the data is damaged.

In the foregoing process, the CRC value of the data is calculated by a central processing unit core. When a large amount of data needs to be calculated, a large quantity of computing resources of the central processing unit core are consumed.

SUMMARY

Embodiments of this application provide a data check method and a related device. An MC may replace a central processing unit core to complete calculation of a CRC value of target data, thereby effectively reducing computing resources of the central processing unit core.

According to a first aspect of embodiments of this application, a computer is provided. The computer includes a central processing unit core, a memory controller (memory controller, MC), and a memory. The memory stores a plurality of data blocks, and the central processing unit core may read the data blocks from the memory or write the data blocks into the memory through the MC.

When the central processing unit core needs to calculate a CRC value of target data, the central processing unit core may deliver a CRC processing instruction to the MC, where the CRC processing instruction indicates the MC to obtain the CRC value of the target data. After receiving the CRC processing instruction from the central processing unit core, the MC may read the target data from the memory based on the CRC processing instruction. Then, the MC performs a series of complex calculations on the target data to obtain the CRC value of the target data. Finally, the MC sends the CRC value of the target data to the central processing unit core, so that the central processing unit core can use the CRC value of the target data to complete insertion or check of a DIF of the target data.

From the foregoing system, it can be seen that: After receiving the CRC processing instruction sent by the central processing unit core, the MC obtains the target data from the memory, performs calculation on the target data to obtain the CRC value of the target data, and sends the CRC value of the target data to the central processing unit core. In the foregoing process, the MC may replace the central processing unit core to complete the calculation of the CRC value of the target data. It can be seen that, when a processor needs to obtain a CRC value of a large amount of data, the central processing unit core does not need to complete calculation of the CRC value of the data, but directly obtains the CRC value of the data from the MC, thereby effectively reducing computing resources of the central processing unit core.

In a possible implementation, the CRC processing instruction includes a length of the target data and a start address for storing the target data, and the MC is further configured to: determine an address range for storing the target data in the memory based on the length of the target data and the start address for storing the target data; and obtain the target data from the memory based on the address range for storing the target data. In the foregoing implementation, after receiving the CRC processing instruction, the MC may parse the CRC processing instruction to obtain the length of the target data and the start address for storing the target data. In this way, the MC can calculate the length of the target data and the start address for storing the target data, to obtain the address range for storing the target data, and obtain the target data from the memory based on the address range for storing the target data.

In a possible implementation, the length of the target data is greater than 256 bytes. In the foregoing implementation, the length of the target data is usually an integer multiple of 256 bytes. For example, the length of the target data may be 512 bytes. For another example, the length of the target data may also be 1024 bytes. For another example, the length of the target data may also be 4096 bytes. Currently, when performing the calculation on the CRC value, the central processing unit core can calculate only data of 64 bytes each time. Under an existing standard, a length of a piece of complete data (which may also be referred to as a data block) is usually 512 bytes. If the central processing unit core needs to complete calculation of a CRC value of a piece of complete data, eight calculations need to be performed. Correspondingly, the central processing unit core needs to deliver eight instructions, to obtain data of 64 bytes from the memory successively, to finally obtain the complete data. However, when the MC calculates the CRC value, there is no limitation on the length of the data. Therefore, the central processing unit core notifies the MC of the length of the target data through a CRC processing instruction, so that the MC can directly obtain the target data from the memory based on the instruction, which is equivalent to directly obtaining several pieces of complete data. In this way, the processor does not need to deliver a plurality of instructions to obtain a piece of complete data, and only one instruction is required to obtain at least one piece of complete data, so that instruction overheads of the processor can be effectively reduced.

In a possible implementation, the computer includes an MC set, and the central processing unit core is further configured to determine the MC from the MC set based on the address range for storing the target data, where the address range for storing the target data is in an address range allocated to the MC. In the foregoing implementation, the computer includes the MC set formed by a plurality of MCs, and each MC is configured to manage a part of storage fields of the memory, in other words, a specific address range is allocated to each MC. When the central processing unit core needs to obtain the CRC value of the target data, the central processing unit core may first determine the address range for storing the target data. Then, the central processing unit core may determine an address range corresponding to an MC in which the address range for storing the target data is located. In this way, the central processing unit core may determine that the MC is configured to perform calculation of the CRC value of the target data, and deliver the CRC processing instruction to the MC.

In a possible implementation, the MC is further configured to perform calculation on the target data based on a CRC16 algorithm or a CRC32 algorithm, to obtain the CRC value of the target data.

In a possible implementation, the memory is a local memory or a remote memory.

In a possible implementation, the memory and the MC are connected through a memory bus.

According to a second aspect of embodiments of this application, a data check method is provided. The method is applied to a computer, and the computer includes a central processing unit core, an MC, and a memory. The method includes: The central processing unit core sends a CRC processing instruction to the MC; the MC obtains target data from the memory based on the CRC processing instruction; the MC performs calculation on the target data to obtain a CRC value of the target data; and the MC sends the CRC value to the central processing unit core.

From the foregoing method, it can be seen that: After receiving the CRC processing instruction sent by the central processing unit core, the MC obtains the target data from the memory, performs calculation on the target data to obtain the CRC value of the target data, and sends the CRC value of the target data to the central processing unit core. In the foregoing process, the MC may replace the central processing unit core to complete the calculation of the CRC value of the target data. It can be seen that, when a processor needs to obtain a CRC value of a large amount of data, the central processing unit core does not need to complete calculation of the CRC value of the data, but directly obtains the CRC value of the data from the MC, thereby effectively reducing computing resources of the central processing unit core.

In a possible implementation, the CRC processing instruction includes a length of the target data and a start address for storing the target data, and that the MC obtains the target data from the memory based on the CRC processing instruction specifically includes: The MC determines an address range for storing the target data in the memory based on the length of the target data and the start address for storing the target data; and the MC obtains the target data from the memory based on the address range for storing the target data.

In a possible implementation, the length of the target data is greater than 256 bytes.

In a possible implementation, the computer includes an MC set, and before the central processing unit core sends a CRC processing instruction to the MC, the method further includes: The central processing unit core determines the MC from the MC set based on the address range for storing the target data, where the address range for storing the target data is in an address range allocated to the MC.

In a possible implementation, that the MC performs calculation on the target data to obtain the CRC value of the target data specifically includes: The MC performs calculation on the target data based on a CRC16 algorithm or a CRC32 algorithm, to obtain the CRC value of the target data.

In a possible implementation, the memory is a local memory or a remote memory.

In a possible implementation, the memory and the MC are connected through a memory bus.

According to a third aspect of embodiments of this application, an MC is provided. The MC is disposed in a computer, the computer further includes a central processing unit core and a memory, and the MC includes: a receiving module, configured to receive a CRC processing instruction sent by the central processing unit core; an obtaining module, configured to obtain target data from the memory based on the CRC processing instruction; a calculation module, configured to perform calculation on the target data to obtain a CRC value of the target data; and a sending module, configured to send the CRC value to the central processing unit core.

In a possible implementation, the CRC processing instruction includes a length of the target data and a start address for storing the target data, and the obtaining module is further configured to: determine an address range for storing the target data in the memory based on the length of the target data and the start address for storing the target data; and obtain the target data from the memory based on the address range for storing the target data.

In a possible implementation, the length of the target data is greater than 256 bytes.

In a possible implementation, the computer includes an MC set, the MC belongs to the MC set, and the address range for storing the target data is in an address range allocated to the MC.

In a possible implementation, the calculation module is further configured to perform calculation on the target data based on a CRC16 algorithm or a CRC32 algorithm, to obtain the CRC value of the target data.

In a possible implementation, the memory is a local memory or a remote memory.

In a possible implementation, the memory and the MC are connected through a memory bus.

According to a fourth aspect of embodiments of this application, a data check method is provided. The method is applied to a computer, and the computer includes a central processing unit core, an MC, and a memory. The method includes: The MC receives a CRC processing instruction sent by the central processing unit core; the MC obtains target data from the memory based on the CRC processing instruction; the MC performs calculation on the target data to obtain a CRC value of the target data; and the MC sends the CRC value to the central processing unit core.

In a possible implementation, the CRC processing instruction includes a length of the target data and a start address for storing the target data, and that the MC obtains the target data from the memory based on the CRC processing instruction specifically includes: The MC determines an address range for storing the target data in the memory based on the length of the target data and the start address for storing the target data; and the MC obtains the target data from the memory based on the address range for storing the target data.

In a possible implementation, the length of the target data is greater than 256 bytes.

In a possible implementation, the computer includes an MC set, the MC belongs to the MC set, and the address range for storing the target data is in an address range allocated to the MC.

In a possible implementation, that the MC performs calculation on the target data to obtain the CRC value of the target data specifically includes: The MC performs calculation on the target data based on a CRC16 algorithm or a CRC32 algorithm, to obtain the CRC value of the target data.

In a possible implementation, the memory is a local memory or a remote memory.

In a possible implementation, the memory and the MC are connected through a memory bus.

In embodiments of this application, after receiving the CRC processing instruction sent by the central processing unit core, the MC obtains the target data from the memory, performs calculation on the target data to obtain the CRC value of the target data, and sends the CRC value of the target data to the central processing unit core. In the foregoing process, the MC may replace the central processing unit core to complete the calculation of the CRC value of the target data. It can be seen that, when the processor needs to obtain a CRC value of a large amount of data, the central processing unit core does not need to complete calculation of the CRC value of the data, but directly obtains the CRC value of the data from the MC, thereby effectively reducing computing resources of the central processing unit core.

DESCRIPTION OF EMBODIMENTS

Embodiments of this application provide a data check method and a related device. An MC may replace a central processing unit core to complete calculation of a CRC value of target data, thereby effectively reducing computing resources of the central processing unit core.

In the specification, claims, and accompanying drawings of this application, the terms "first", "second", and the like are intended to distinguish between similar objects but do not necessarily indicate a specific order or sequence. It should be understood that the data used in such a way are interchangeable in proper circumstances so that the embodiments described herein can be implemented in other orders than the order illustrated or described herein. In addition, the terms "include", "contain" and any other variants mean to cover the non-exclusive inclusion, for example, a process, method, system, product, or device that includes a list of steps or modules is not necessarily limited to those steps or modules, but may include other steps or modules not expressly listed or inherent to such a process, method, product, or device. Names or numbers of steps in this application do not mean that the steps in the method procedure need to be performed in a time/logical sequence indicated by the names or numbers. An execution sequence of the steps in the procedure that have been named or numbered can be changed based on a technical objective to be achieved, provided that same or similar technical effect can be achieved. Division of the modules in this application is logical division. In actual application, there may be another division manner. For example, a plurality of modules may be combined or integrated into another system, or some features may be ignored or not performed. In addition, the displayed or discussed mutual coupling or direct coupling or communication connection may be through some ports, and the indirect coupling or communication connection between modules may be in an electrical form or another similar form. This is not limited in this application. In addition, modules or sub-modules described as separate components may be or may not be physically separated, or may be or may not be physical modules, or may be distributed into a plurality of circuit modules. An objective of the solution of this application may be achieved by selecting some or all of the modules according to actual requirements.

The following briefly describes all terms in embodiments of this application.

Central processing unit core (central processing unit core, CPU core): The central processing unit core is a core chip in a processor, and is made of monocrystalline silicon. The central processing unit core is configured to complete all calculations, receive/store instructions, data processing, and the like, and is a digital processing core.

Memory: The memory is one of important components of a computer. All programs in the computer are run in the memory. As long as the computer starts to run, an operating system of the computer transfers data on which an operation is to be performed from the memory to the central processing unit core for the operation. When the operation is completed, the central processing unit core sends a result out.

Direct memory access (direct memory access, DMA) controller: The DMA controller may replace the central processing unit core to complete a data transmission operation. In addition to performing a little piece of processing at the beginning and end of data transmission (performing interrupt processing at the beginning and end of the data transmission) by the central processing unit core, a CPU may perform other tasks during the data transmission. In this way, the central processing unit core and input/output are operating in parallel most of the time. Therefore, efficiency of the entire computer is greatly improved.

Data integrity field (data integrity field, DIF): The DIF is for storing a CRC value of the data and other information. The CRC value may be for checking the data, to ensure integrity, accuracy, and reliability of the data, and ensure that the data is in an objective and real state during the transmission.

Figure 1:
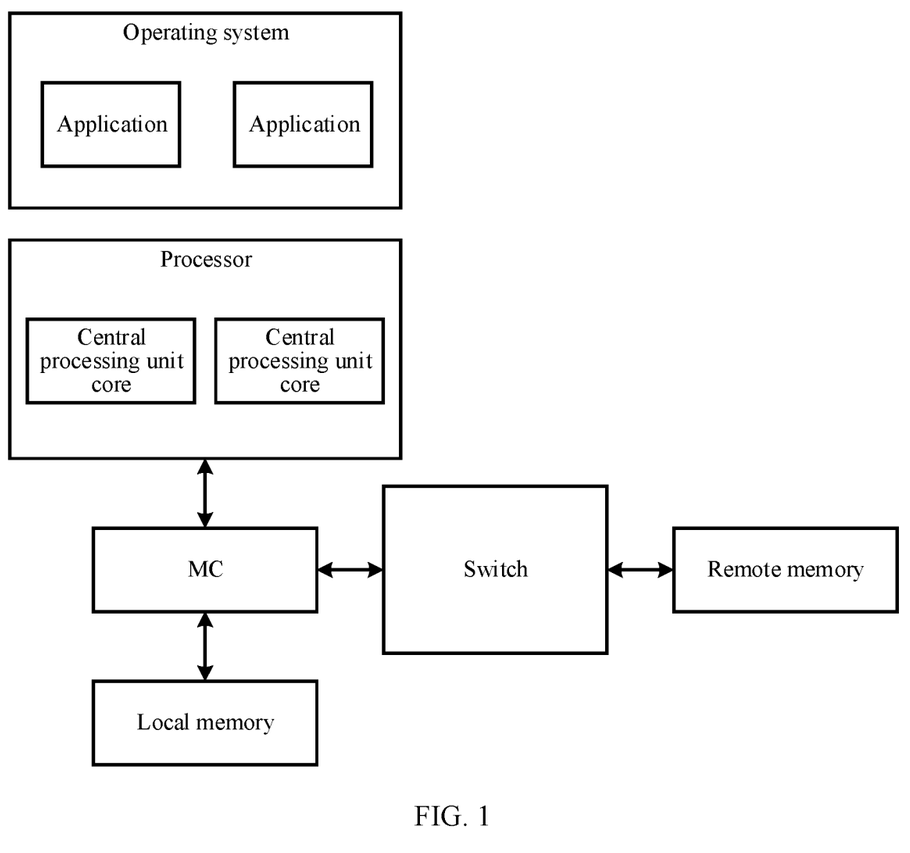
FIG. 1 is a schematic diagram of a structure of a computer according to an embodiment of this application.

Embodiments of this application may be applied to a data storage system, and the data storage system may be mounted on the computer. FIG. 1 is a schematic diagram of a structure of a computer according to an embodiment of this application. As shown in FIG. 1, the computer includes: a local device and a remote device. The local device may include components such as a processor, an MC, and a local memory, and the remote device may include components such as a switch and a remote memory. The following separately describes the foregoing components.

The processor is usually presented in a form of a central processing unit (central processing unit, CPU). The processor is a core component of the entire computer, and includes at least one core (core). A central processing unit core may deliver instructions to other components to implement operations such as calculation, read/write, and transmission of data.

The MC is responsible for data transmission between the memory (including the local memory and the remote memory) and the processor. For example, the central processing unit core may read a piece of data from the local memory or write a piece of data into the local memory in a form of address access through the MC. For another example, the central processing unit core may further access the switch through the MC, and read a piece of data from the remote memory or write a piece of data into the remote memory in the form of address access. It should be noted that, the MC may be used as an independent component, or may be deployed in the processor together with the central processing unit core. This is not limited herein (in FIG. 1, the MC is used as an independent component for schematic description).

The local memory is usually presented in a form of a dynamic random access memory (dynamic random access memory, DRAM), a static random access memory (static random access memory, SRAM), a storage class memory (storage class memory, SCM), or the like. As an inherent storage device in the computer, the local memory may be configured to store a plurality of pieces of data, thereby meeting a data operation requirement of the processor.

The remote memory may also be usually presented in a form of a DRAM, an SRAM, an SCM, or the like. The remote memory, as an additional storage device added to the computer, may also be configured to store a plurality of pieces of data, thereby expanding data storage capacity of the computer.

In a data storage system, data may be distorted during transmission, read/write, or other processes. If data damage cannot be detected in a timely manner, more serious consequences such as data loss may occur. Based on this, data integrity protection may be implemented through a CRC value. Specifically, after obtaining target data from the memory through the MC, the central processing unit core may perform calculation on the target data, to obtain a CRC value of the target data. Based on the CRC value of the target data, the central processing unit core may complete insertion and check of a DIF of the target data.

Specifically, if the local memory stores only the target data, but does not store the CRC value of the target data, the central processing unit core may obtain the target data from the local memory, and complete calculation of the target data, to obtain the CRC value of the target data. Then, the central processing unit core may send the CRC value of the target data to the local memory through the MC, so that the local memory stores the CRC value of the target data, so that related information of the DIF of the target data is perfected, in other words, the processor completes the insertion of the DIF. In this case, the CRC value of the target data stored in the local memory is the originally stored CRC value, and may be used to implement subsequent check of the DIF.

Figure 2:
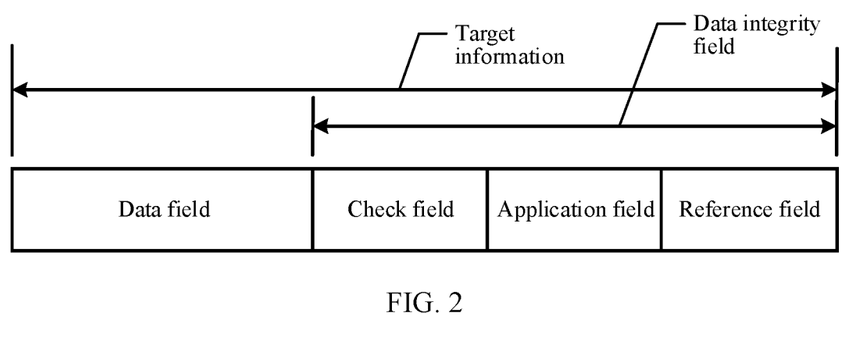
FIG. 2 is a schematic diagram of a structure of target information according to an embodiment of this application.

After the CRC value is assigned to the target data, when the processor needs to process the target data again, the processor no longer obtains the target data only from the local memory, but obtains one piece of target information from the local memory. The target information includes a data field and a data integrity field as shown in FIG. 2 (FIG. 2 is a schematic diagram of a structure of target information according to an embodiment of this application), where the data field is for carrying the target data, the DIF includes a check field, an application field, and a reference field. The check field is for carrying a CRC value (the originally stored CRC value) of the target data stored in the local memory, and the application field and the reference field are for carrying other information. Details are not described herein. Therefore, after obtaining the target information, the central processing unit core may perform the check of the DIF based on the target information. Specifically, the central processing unit core obtains the target data and the originally stored CRC value from the target information, and then performs calculation on the target data again to obtain a recalculated CRC value. Finally, the central processing unit core compares the recalculated CRC value with the original stored CRC value to determine whether the data is distorted. So far, the processor completes the check of the DIF.

It should be understood that the foregoing process is merely schematically described by using an example in which the processor obtains the target data from the local memory. If the target data is stored in the remote memory, the processor may also obtain the target data from the remote memory for processing. In this case, the processor may also implement the insertion and check of the DIF. It should be noted that, after the processor completes the insertion of the DIF, when the processor obtains the target data from the remote memory again or sends the target data to the remote memory, because the target information including the target data passes through the switch, the switch also performs the check of the DIF. Therefore, integrity of the target data in an entire transmission link is ensured.

Figure 3:
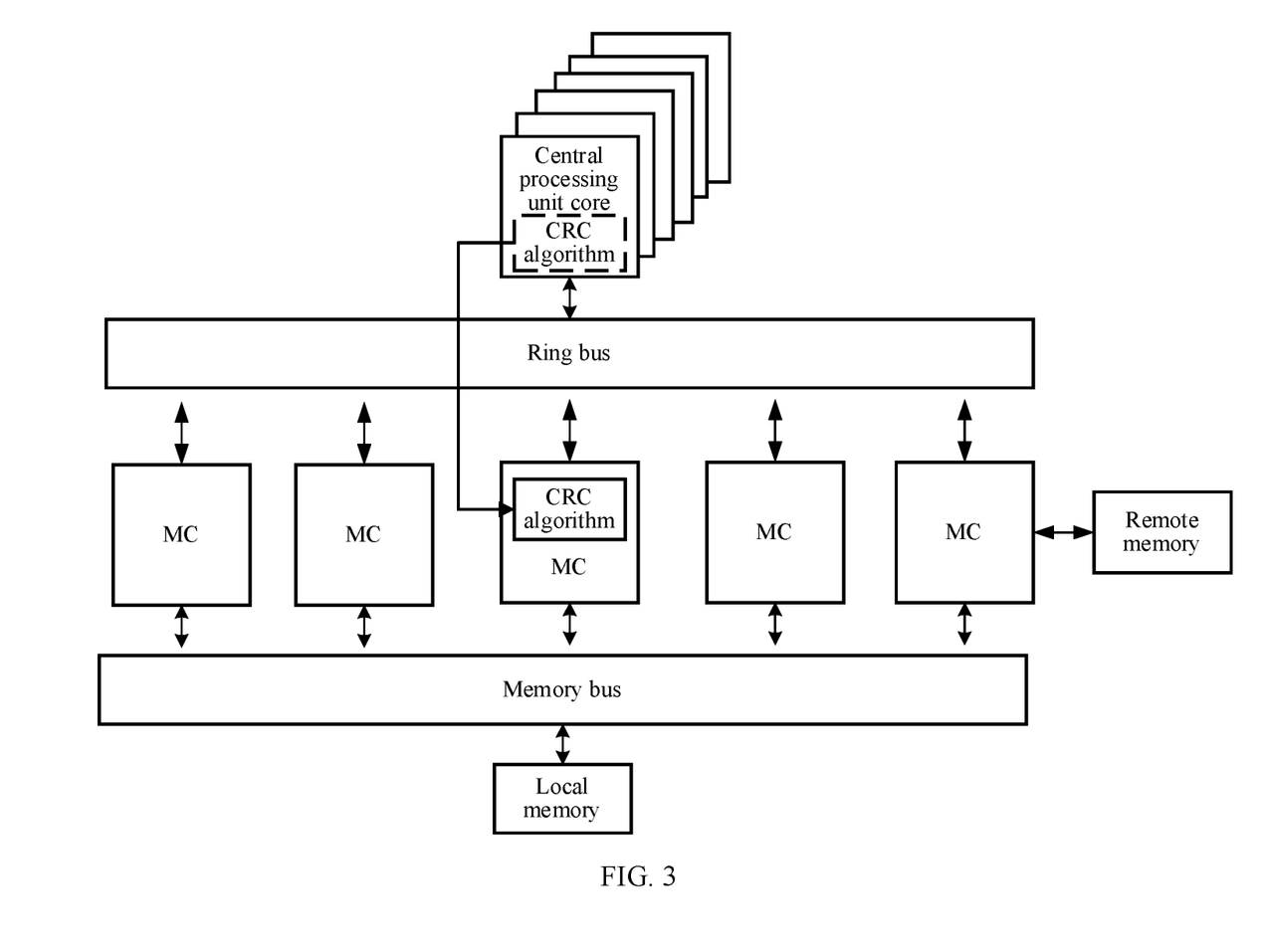
FIG. 3 is a schematic diagram of setting a CRC algorithm for an MC according to an embodiment of this application.
Figure 4:
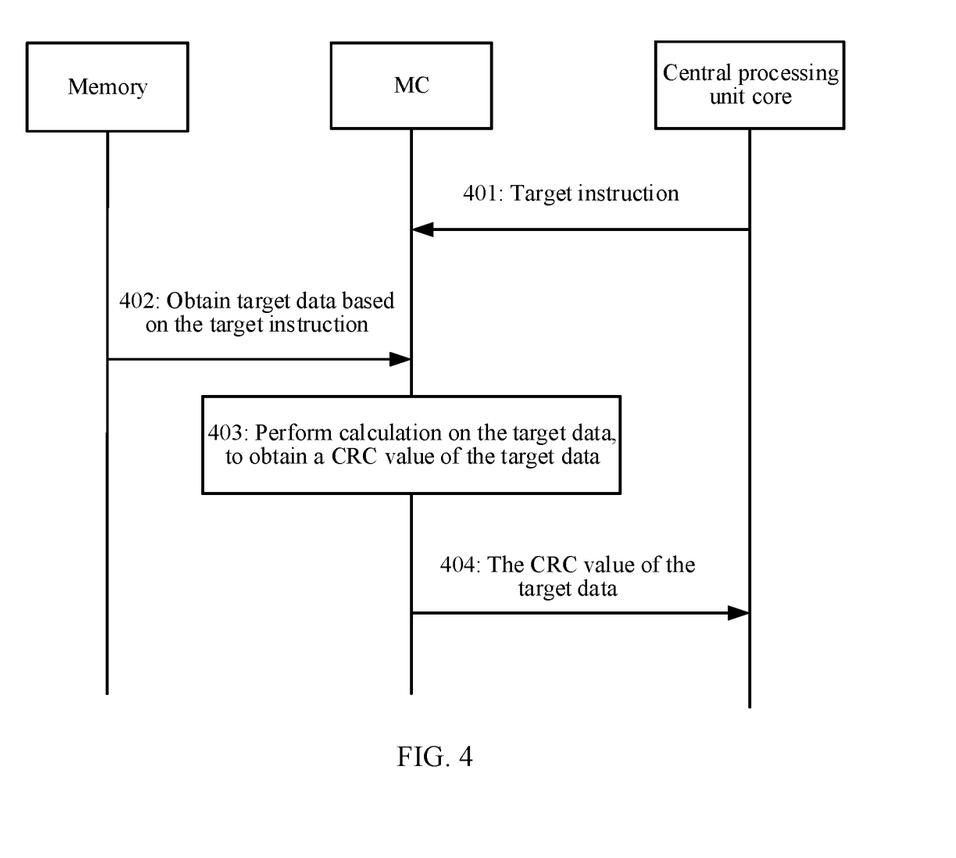
FIG. 4 is a schematic flowchart of a data check method according to an embodiment of this application.

In conclusion, when being performed by the processor, both the insertion and the check of the DIF involve calculation of the CRC value of the data. Once more data needs to be processed, the amount of calculation required by the central processing unit core increases, which consumes a large quantity of computing resources of the central processing unit core. To resolve this problem, embodiments of this application provide a data check method. The method may be implemented by using the computer shown in FIG. 1. Different from conventional technologies, an MC in embodiments of this application is preset with a CRC algorithm, for example, a CRC16 algorithm or a CRC32 algorithm. Specifically, as shown in FIG. 3 (FIG. 3 is a schematic diagram of setting a CRC algorithm for an MC according to an embodiment of this application), in a computer, a central processing unit core and an MC are connected through a ring bus, the MC and a local memory are connected through a memory bus, and the MC is integrated with a network adapter. Therefore, the MC may implement wireless communication with the remote memory. To enable the MC to have a function of calculating a CRC value, a CRC algorithm originally completed by the central processing unit core may be pushed down to the MC. Therefore, the MC may replace the central processing unit core to implement calculation of the CRC value of data. FIG. 4 is a schematic flowchart of a data check method according to an embodiment of this application. As shown in FIG. 4, the method includes the following steps.

401: An MC receives a CRC processing instruction from a central processing unit core.

In this embodiment, a memory may be divided into a plurality of storage fields, one storage field may store data of 64 bytes, and each storage field corresponds to one address (usually a physical address). For an MC set shown in FIG. 3, each MC may be configured to manage a part of the storage fields of the memory. For example, if the memory is divided into 10 storage fields, an MC1 may be configured to manage five of the storage fields, and an MC2 may be configured to manage remaining five storage fields. Therefore, a specific address range is allocated to each MC.

When the central processing unit core needs to calculate a CRC value of target data, the central processing unit core may first determine an address range for storing the target data. Generally, a length of the target data is greater than 256 bytes. Therefore, the central processing unit core may determine a plurality of addresses corresponding to a plurality of storage fields for storing the target data, namely, the address range for storing the target data. Then, the central processing unit core may obtain an address range corresponding to each MC in the MC set, and determine an address range corresponding to an MC in which the address range for storing the target data is located. In this way, the central processing unit core may determine that the MC is configured to perform calculation of the CRC value of the target data, and deliver the CRC processing instruction to the MC.

Then, the central processing unit core may deliver the CRC processing instruction to the MC, where the CRC processing instruction indicates the MC to obtain the CRC value of the target data. Specifically, the CRC processing instruction may include the length of the target data, a start address for storing the target data, and a CRC operation code. The following separately describes the three parts of information included in the CRC processing instruction.

The length of the target data is usually greater than 256 bytes. Specifically, the length of the target data may be an integer multiple of 256 bytes. For example, the length of the target data may be 512 bytes. For another example, the length of the target data may also be 1024 bytes. For another example, the length of the target data may also be 4096 bytes. Currently, when performing the calculation on the CRC value, the central processing unit core can calculate only data of 64 bytes each time. Under an existing standard, a length of a piece of complete data (which may also be referred to as a data block) is usually 512 bytes. If the central processing unit core needs to complete calculation of a CRC value of a piece of complete data, eight calculations need to be performed. Correspondingly, the central processing unit core needs to deliver eight instructions, to obtain data of 64 bytes from the memory successively, to finally obtain the complete data, and calculate the CRC value thereof to obtain the CRC value of the complete data. However, when the MC calculates the CRC value, there is no limitation on the length of the data. Therefore, the central processing unit core notifies the MC of the length of the target data through an instruction (a CRC processing instruction), so that the MC can directly obtain the target data from the memory based on the instruction, which is equivalent to directly obtaining several pieces of complete data (because the length of the target data is usually the integer multiple of 256 bytes). In this way, the processor does not need to deliver a plurality of instructions to obtain a piece of complete data, and only one instruction is required to obtain at least one piece of complete data, so that instruction overheads of the processor can be effectively reduced.

For the memory, one address corresponds to one storage field of the memory, and one storage field may store data of 64 bytes. Therefore, the target data needs to occupy the plurality of storage fields for storage. For example, if the length of the target data is 512 bytes, the target data needs to occupy eight storage fields for storage. It should be noted that the plurality of storage fields for storing the target data are continuous in physical locations. Therefore, the plurality of addresses (which may also be referred to as the plurality of addresses for storing the target data) corresponding to the plurality of storage fields for storing the target data are also continuous. Therefore, when the central processing unit core needs to obtain the target data from the memory, the central processing unit core may notify the MC of the start address for storing the target data (which is a first address in the plurality of addresses for storing the target data, corresponding to a first storage field in the plurality of storage fields for storing the target data) through the CRC processing instruction, so that based on the start address for storing the target data and the length of the target data, the MC determines the plurality of addresses for storing the target data, that is, the address range for storing the target data.

In addition, the central processing unit core may deliver the CRC operation code to the MC through the CRC processing instruction. The CRC operation code indicates the MC to perform calculation on the CRC value of the target data.

402: The MC obtains the target data from the memory based on the CRC processing instruction.

After receiving the CRC processing instruction from the central processing unit core, the MC obtains the target data from the memory based on the CRC processing instruction. Specifically, the MC first parses the CRC processing instruction to obtain the length of the target data, the start address for storing the target data, and the CRC operation code. Then, the MC determines the address range for storing the target data based on the length of the target data and the start address for storing the target data. Finally, the MC obtains the target data from the memory based on the address range for storing the target data.

For example, it is assumed that the length of the target data is 512 bytes, so that the MC may determine, based on the length of the target data, that the address range for storing the target data includes eight addresses. Then, based on the start address for storing the target data, the MC may deduce seven addresses that are located after the start address. In this way, the MC may finally determine the eight addresses for storing the target data, access eight corresponding storage fields in the memory based on the eight addresses, and read data in the eight storage fields, to obtain the target data.

For another example, it is assumed that the length of the target data is 4096 bytes, so that the MC may determine, based on the length of the target data, that the address range for storing the target data includes 64 addresses. Then, based on the start address for storing the target data, the MC may deduce 63 addresses that are located after the start address. In this way, the MC may finally determine the 64 addresses for storing the target data, access 64 corresponding storage fields in the memory based on the 64 addresses, and read data in the 64 storage fields, to obtain the target data.

It should be understood that the memory in this embodiment may be a local memory or a remote memory.

403: The MC performs calculation on the target data to obtain the CRC value of the target data.

After obtaining the target data, the MC may perform a series of complex calculations on the target data to obtain the CRC value of the target data. Specifically, the MC calls a preset CRC16 algorithm or CRC32 algorithm based on the CRC operation code, and calculates the target data by the CRC16 algorithm or the CRC32 algorithm, to obtain the CRC value of the target data.

404: The MC sends the CRC value of the target data to the central processing unit core.

After obtaining the CRC value of the target data, the MC sends the CRC value of the target data to the central processing unit core, so that the central processing unit core can use the CRC value of the target data to complete insertion or check of a DIF of the target data.

In this embodiment, after receiving the CRC processing instruction sent by the central processing unit core, the MC obtains the target data from the memory, performs calculation on the target data to obtain the CRC value of the target data, and sends the CRC value of the target data to the central processing unit core. In the foregoing process, the MC may replace the central processing unit core to complete the calculation of the CRC value of the target data. It can be seen that, when the processor needs to obtain a CRC value of a large amount of data, the central processing unit core does not need to complete calculation of the CRC value of the data, but directly obtains the CRC value of the data from the MC, thereby effectively reducing computing resources of the central processing unit core.

Further, compared with that a CRC value calculation task is handed over to a direct memory access (direct memory access, DMA) controller for execution, in other words, the central processing unit core processes own tasks (tasks other than the CRC value calculation task), that the DMA controller processes the CRC value calculation task needs to be generated in a process in which the DMA controller transfers the target data from the memory to the DMA controller. For example, the central processing unit core processes and executes a DMA instruction, to control the DMA controller to read the target data from the memory. In a process of reading the target data, the DMA controller performs a CRC operation, and the DMA controller needs to return an operation result to the central processing unit core as an output parameter of the DMA instruction. A process in which the target data is transferred to the DMA controller and that the central processing unit core processes the own tasks are performed asynchronously. When the central processing unit core processes a task, and the DMA controller returns the CRC value of the target data to the central processing unit core, the task currently processed by the central processing unit core is interrupted. The central processing unit core needs to re-execute the interrupted task before processing the CRC value of the target data. In this status, it takes long time for the central processing unit core to obtain the CRC value of the target data, in other words, there is a long delay. In this embodiment, a CRC value calculation task performed by the MC is included in the task currently processed by the central processing unit core, and the task currently processed by the central processing unit core is to obtain the CRC value of the target data. After completing the calculation, the MC returns the CRC value of the target data to the central processing unit core. The central processing unit core may end the currently processed task. Therefore, time required by the central processing unit core to obtain the CRC value of the target data is short, in other words, there is a short delay.

Further, on a transmission path of the target data, the target data is stored in the memory. The MC may access the target data in the memory by the memory bus shown in FIG. 3, to complete the calculation of the CRC value of the target data. However, for calculating the CRC value by using the DMA controller, because the DMA controller needs to be connected to the ring bus shown in FIG. 3 (not shown in FIG. 3), and the DMA controller needs to access the memory by the ring bus, the memory controller MC, and a memory bus, the transmission path is long, and data processing efficiency is poor.

Further, the MC does not need to transfer the target data to the central processing unit core, so that input/output (input/output, I/O) overheads of the processor can be reduced.

Further, the central processing unit core does not need to deliver a plurality of instructions to obtain one piece of complete data, and only one instruction is required to obtain at least one piece of complete data, so that instruction overheads of the processor can be effectively reduced.

An embodiment of this application further provides a processor architecture, including the foregoing central processing unit core and the memory controller, and further provides an instruction set for the central processing unit core to run. The instruction set includes a CRC call instruction, for example, may be defined as CRC16, CRC32, or another CRC algorithm. The CRC call command has two input parameters: inputting a length of data and a start address of a memory. When writing a program to control the central processing unit core to work, a programmer may use the CRC call command, and input the length of the data and the start address of the memory into the input parameters of the CRC call command. When running the CRC call command, the central processing unit core sends a CRC processing instruction to the memory controller. The memory controller performs the method in step 401 to step 404 according to the CRC processing instruction.

Figure 5:
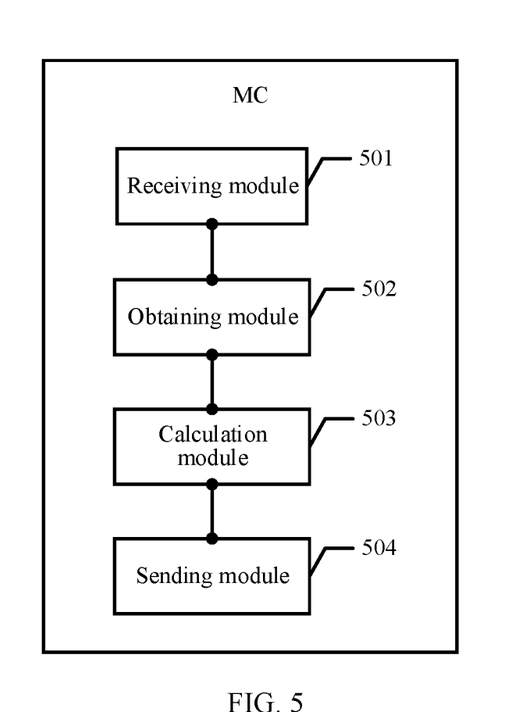
FIG. 5 is a schematic diagram of a structure of an MC according to an embodiment of this application.

The foregoing describes in detail the data check method provided in embodiments of this application. The following describes a memory controller provided in embodiments of this application. FIG. 5 is a schematic diagram of a structure of an MC according to an embodiment of this application. As shown in FIG. 5, the MC is disposed in the computer shown in FIG. 1, and the computer further includes a central processing unit core and a memory. The MC includes:

a receiving module 501, configured to receive a CRC processing instruction sent by the central processing unit core;

an obtaining module 502, configured to obtain target data from the memory based on the CRC processing instruction;

a calculation module 503, configured to perform calculation on the target data to obtain a CRC value of the target data; and a sending module 504, configured to send the CRC value to the central processing unit core.

In a possible implementation, the CRC processing instruction includes a length of the target data and a start address for storing the target data, and the obtaining module 502 is further configured to: determine an address range for storing the target data in the memory based on the length of the target data and the start address for storing the target data; and obtain the target data from the memory based on the address range for storing the target data.

In a possible implementation, the length of the target data is greater than 256 bytes.

In a possible implementation, the computer includes an MC set, the MC belongs to the MC set, and the address range for storing the target data is in an address range allocated to the MC.

In a possible implementation, the calculation module 503 is further configured to perform calculation on the target data based on a CRC16 algorithm or a CRC32 algorithm, to obtain the CRC value of the target data.

In a possible implementation, the memory is a local memory or a remote memory.

In a possible implementation, the memory and the MC are connected through a memory bus.

It should be noted that, because content such as information exchange between and an execution process of modules/units of the foregoing apparatus belongs to the same idea as the method embodiment of this application, the content brings same technical effects as the method embodiment of this application. For specific content, refer to the descriptions in the method embodiment of this application shown above. Details are not described herein again.

Figure 6:
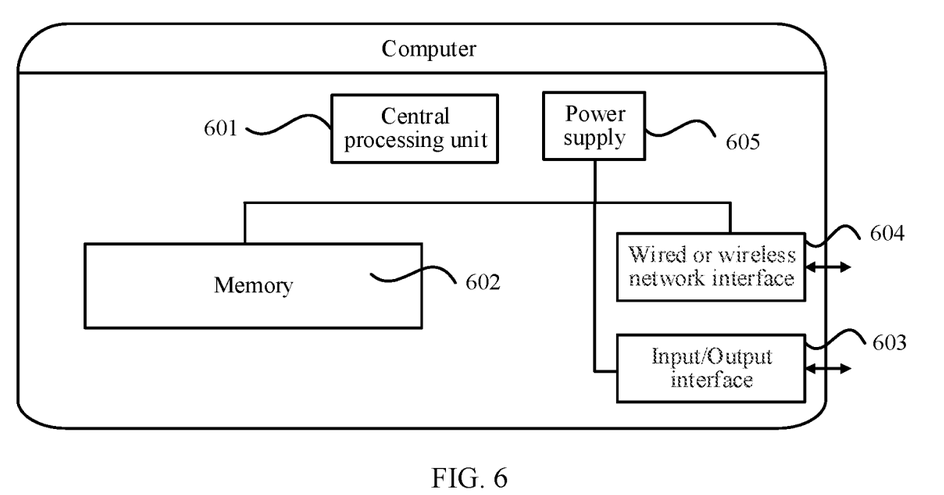
FIG. 6 is another schematic diagram of a structure of a computer according to an embodiment of this application.

FIG. 6 is another schematic diagram of a structure of a computer according to an embodiment of this application. As shown in FIG. 6, an embodiment of the computer in embodiments of this application may include one or more central processing units 601, a memory 602, an input/output interface 603, a wired or wireless network interface 604, and a power supply 605.

The memory 602 may be transient storage or persistent storage. Further, the central processing unit 601 may be configured to communicate with the memory 602, and perform a series of instruction operations in the memory 602 on the computer.

In this embodiment, the central processing unit 601 may perform operations performed by the central processing unit core and the MC in the embodiment shown in FIG. 4. Details are not described herein again.

In this embodiment, division of specific functional modules in the central processing unit 601 may be similar to division of modules such as the receiving module, the obtaining module, the calculating module, and the sending module described in FIG. 5. Details are not described herein again.

An Embodiment of this application further relates to a computer storage medium, including computer-readable instructions. When the computer-readable instructions are performed, the method shown in FIG. 4 is implemented.

An embodiment of this application further relates to a computer program product that includes instructions. When the computer program product runs on a computer, the computer is enabled to perform the method shown in FIG. 4.

A person skilled in the art may clearly understand that, for the purpose of convenient and brief description, for detailed working processes of the foregoing systems, apparatuses, and units, refer to corresponding processes in the foregoing method embodiments. Details are not described herein again.

In the several embodiments provided in this application, it should be understood that the disclosed system, apparatus, and method may be implemented in other manners. For example, the described apparatus embodiment is merely schematic. For example, the division of the units is merely logical function division. In actual application, there may be another division manner. For example, a plurality of units or components may be combined or integrated into another system, or some features may be ignored or not performed. In addition, the displayed or discussed mutual couplings or direct couplings or communication connections may be implemented by some interfaces. The indirect couplings or communication connections between the apparatuses or units may be implemented in an electronic form, a mechanical form, or another form.

The units described as separate parts may or may not be physically separate, and parts displayed as units may or may not be physical units, and may be located at one location, or may be distributed on a plurality of network units. Some or all of the units may be selected based on actual requirements to achieve an objective of the solutions of the embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of the software function unit and sold or used as an independent product, the integrated unit may be stored in a computer-readable storage medium. Based on such an understanding, the technical solutions of this application essentially, or the part contributing to conventional technologies, or all or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes: a USB flash drive, a removable hard disk, a read-only memory (ROM, Read-Only Memory), a random access memory (RAM, Random Access Memory), a magnetic disk, or an optical disc and other medium that can store program codes.

What is claimed is:

1. A computer, comprising:
    at least one central processing unit core, a memory controller (MC) set comprising a plurality of MCs, and at least one memory, wherein:
    the at least one central processing unit core is configured to send a cyclic redundancy check (CRC) processing instruction to an MC of the plurality of MCs in the MC set, wherein the at least one central processing unit core is configured to select the MC from the plurality of MCs in the MC set, and the CRC processing instruction indicates the MC to obtain a CRC value of target data from the at least one memory; and
    the MC is configured to:
    obtain the target data from the at least one memory based on the CRC processing instruction;
    perform calculation on the target data to obtain the CRC value of the target data; and
    send the CRC value to the at least one central processing unit core.

2. The computer according to claim 1, wherein the CRC processing instruction comprises a length of the target data and a start address for storing the target data, and the MC is further configured to:
    determine an address range for storing the target data in the at least one memory based on the length of the target data and the start address for storing the target data; and
    obtain the target data from the at least one memory based on the address range for storing the target data.

3. The computer according to claim 2, wherein the length of the target data is greater than 256 bytes.

4. The computer according to claim 2, wherein each MC in the MC set is configured to manage a part of the at least one memory, the at least one central processing unit core is configured to determine the MC from the MC set based on the address range for storing the target data, and the address range for storing the target data is in an address range allocated to the MC.

5. The computer according to claim 1, wherein the MC is further configured to perform calculation on the target data based on a CRC16 algorithm or a CRC32 algorithm, to obtain the CRC value of the target data.

6. The computer according to claim 1, wherein the at least one memory comprises a local memory or a remote memory.

7. The computer according to claim 1, wherein the at least one memory and the MC are connected through a memory bus.

8. A method, wherein the method is applied to a memory controller (MC) set comprising a plurality of MCs, the MC set is disposed in a computer, the computer further comprises at least one central processing unit core and at least one memory, and the method comprises:
- receiving, by an MC of the plurality of MCs in the MC set, a cyclic redundancy check (CRC) processing instruction sent by the at least one central processing unit core, wherein the at least one central processing unit core is configured to select the MC from the plurality of MCs in the MC set, and the CRC processing instruction indicates the MC to obtain a CRC value of target data from the at least one memory;
- obtaining, by the MC, the target data from the at least one memory based on the CRC processing instruction;
- performing, by the MC, calculation on the target data to obtain the CRC value of the target data; and
- sending, by the MC, the CRC value to the at least one central processing unit core.

9. The method according to claim 8, wherein the CRC processing instruction comprises a length of the target data and a start address for storing the target data, and the obtaining, by the MC, the target data from the at least one memory based on the CRC processing instruction specifically comprises:
- determining, by the MC, an address range for storing the target data in the at least one memory based on the length of the target data and the start address for storing the target data; and
- obtaining, by the MC, the target data from the at least one memory based on the address range for storing the target data.

10. The method according to claim 9, wherein the length of the target data is greater than 256 bytes.

11. The method according to claim 9, wherein each MC in the MC set is configured to manage a part of the at least one memory, and the address range for storing the target data is in an address range allocated to the MC.

12. The method according to claim 8, wherein the performing, by the MC, calculation on the target data to obtain the CRC value of the target data specifically comprises:
- performing, by the MC, calculation on the target data based on a CRC16 algorithm or a CRC32 algorithm, to obtain the CRC value of the target data.

13. The method according to claim 8, wherein the at least one memory comprises a local memory or a remote memory.

14. The method according to claim 8, wherein the at least one memory and the MC are connected through a memory bus.

15. A memory controller (MC), wherein the MC is disposed in a computer, the computer comprises an MC set, the MC set comprises a plurality of MCs, the computer further comprises at least one central processing unit core and at least one memory, and the MC is configured to:
- receive a cyclic redundancy check (CRC) processing instruction sent by the at least one central processing unit core, wherein the at least one central processing unit core is configured to select the MC from the plurality of MCs in the MC set, and the CRC processing instruction indicates the MC to obtain a CRC value of target data from the at least one memory;
- obtain the target data from the at least one memory based on the CRC processing instruction;
- perform calculation on the target data to obtain the CRC value of the target data; and
- send the CRC value to the at least one central processing unit core.

16. The MC according to claim 15, wherein the CRC processing instruction comprises a length of the target data and a start address for storing the target data, and the MC is further configured to:
- determine an address range for storing the target data in the at least one memory based on the length of the target data and the start address for storing the target data; and
- obtain the target data from the at least one memory based on the address range for storing the target data.

17. The MC according to claim 16, wherein the length of the target data is greater than 256 bytes.

18. The MC according to claim 16, wherein each MC in the MC set is configured to manage a part of the at least one memory, and the address range for storing the target data is in an address range allocated to the MC.

19. The MC according to claim 15, wherein the MC is further configured to perform calculation on the target data based on a CRC16 algorithm or a CRC32 algorithm, to obtain the CRC value of the target data.

20. The MC according to claim 15, wherein the at least one memory comprises a local memory or a remote memory.

* * * * *